US010613517B2

(12) United States Patent
Allardice et al.

(10) Patent No.: US 10,613,517 B2
(45) Date of Patent: Apr. 7, 2020

(54) METHOD FOR COMMANDING AN INDUSTRIAL ROBOT

(71) Applicant: STAUBLI FAVERGES, Faverges (FR)

(72) Inventors: Etienne Allardice, Ugine (FR); Stephane Delor, Annecy (FR)

(73) Assignee: STAUBLI FAVERGES, Faverges (FR)

( * ) Notice: Subject to any disclaimer, the term of this patent is extended or adjusted under 35 U.S.C. 154(b) by 279 days.

(21) Appl. No.: 15/657,460

(22) Filed: Jul. 24, 2017

(65) Prior Publication Data

US 2018/0032061 A1 Feb. 1, 2018

(30) Foreign Application Priority Data

Jul. 29, 2016 (FR) ..................................... 16 57385

(51) Int. Cl.
| | |
|---|---|
| *G05B 19/4103* | (2006.01) |
| *B25J 19/06* | (2006.01) |
| *B25J 9/16* | (2006.01) |
| *B25J 9/04* | (2006.01) |
| *G05B 19/414* | (2006.01) |

(52) U.S. Cl.
CPC ............ *G05B 19/4103* (2013.01); *B25J 9/04* (2013.01); *B25J 9/1674* (2013.01); *B25J 19/061* (2013.01); *G05B 19/4141* (2013.01); *G05B 2219/34131* (2013.01); *G05B 2219/34169* (2013.01); *G05B 2219/45083* (2013.01)

(58) Field of Classification Search
CPC ............ G05B 19/4103; G05B 19/4141; G05B 2219/34131; G05B 2219/34169; G05B 2219/45083; B25J 9/04; B25J 9/1674; B25J 19/061

USPC ......................................................... 700/245
See application file for complete search history.

(56) References Cited

U.S. PATENT DOCUMENTS

| | | | | | |
|---|---|---|---|---|---|
| 2008/0297382 | A1* | 12/2008 | Risbo | ...................... | G10L 19/10 341/53 |
| 2009/0284206 | A1* | 11/2009 | Wende | ..................... | H02P 31/00 318/490 |
| 2011/0309782 | A1* | 12/2011 | Bonin | ....................... | H02P 6/15 318/611 |

(Continued)

FOREIGN PATENT DOCUMENTS

| | | | |
|---|---|---|---|
| DE | 102004026827 | A1 | 12/2015 |
| FR | 3019953 | A1 | 10/2015 |
| JP | 2011055697 | A * | 3/2011 |

*Primary Examiner* — Abby Y Lin
*Assistant Examiner* — Pum H Thang

(57) ABSTRACT

This method for controlling an industrial robot comprising a moving robot arm provided with at least one electric motor suitable for moving this robot arm includes the following steps:
  a) the execution (1000), by a central unit, of a control program of the robot arm and, in response, the calculation and sending of position instructions of the robot arm;
  b) generation (1004) of supply voltages of the motor by an axis controller as a function of the calculated position instructions, implementing cascading regulators including at least one entry point receiving an input signal; and
  c) controlling (1006) the motor with the generated supply voltages.

During step b), a sound excitation signal is superimposed with the input signal of one of the regulators to form a composite signal, the supply voltages being generated as a function of the composite signal.

11 Claims, 4 Drawing Sheets

(56) References Cited

U.S. PATENT DOCUMENTS

2013/0204404 A1* 8/2013 Kerner .............. G05B 19/404
700/56
2015/0290806 A1 10/2015 Garde \* cited by examiner

METHOD FOR COMMANDING AN INDUSTRIAL ROBOT

CROSS-REFERENCE TO RELATED APPLICATIONS

The instant application claims priority to French patent application no. 1657385, filed on Jul. 29, 2016.

BACKGROUND OF THE INVENTION

The invention relates to an industrial robot, as well as a method for commanding one such industrial robot. The invention more particularly relates to controlling industrial robots including an articulated robot arm with several axes.

Industrial robots are known of the robot arm type, intended to be used in environments in the presence of human operators. For safety reasons, it is desirable for the robot to be able to send communication signals, for example an audible sound, to a human operator located near the robot arm. This for example makes it possible to indicate to an operator that the robot is waiting for a particular action from the operator, or to warn the operator that he should not be in a particular area near the robot because the robot arm will be moving in that area. Typically, the emission of such an audible sound is done using a dedicated transducer that is connected to a control unit of the robot.

However, this solution is not fully satisfactory. One drawback is that it does not make it possible to guarantee that the audible sound will be emitted for the operator. For example, it is possible that although an order to emit the audio signal is delivered by the control unit, no audible sound is in fact emitted by the transducer, for example due to a failure of the transducer or a failure of a data link between the transducer and the control unit. This therefore results in a safety risk for the operator.

The invention more particularly aims to resolve these drawbacks by proposing a method for controlling an industrial robot as well as an industrial robot having improved operating safety, in which an audible sound can be delivered reliably to an operator working near the robot.

BRIEF SUMMARY OF THE INVENTION

To that end, the invention relates to a method for controlling an industrial robot comprising a moving robot arm provided with at least one electric motor suitable for moving this robot arm and provided with a robot controller including a central unit and an axis controller, this method including the following steps:
  a) the execution, by the central unit, of a control program of the robot arm and, in response, the calculation and sending of position instructions of the robot arm;
  b) generation of supply voltages of said motor by the axis controller as a function of the calculated position instructions, using cascading regulators including at least one input point receiving an input signal;
  c) controlling said motor with the generated supply voltages.

During step b), a sound excitation signal is superimposed, by the robot controller, with the input signal of one of the regulators to form a composite signal, the supply voltages being generated as a function of the composite signal.

Owing to the invention, because the supply voltages of the motor of the robot are generated as a function of the composite signal including both the input signal and a sound excitation signal, the emission of the sound signal is inseparable from the operation of the motor. In other words, once the sound excitation signal is superimposed with the input signal within one of the regulators, the supply voltages thus generated by the axis controller control the movement of the motor to move the robot arm, and furthermore mechanically vibrate the motor in a specific manner corresponding to the sound excitation signal. Owing to these vibrations, an audible sound perceptible by an operator located near the robot is emitted. The sound can be emitted once the robot is powered on. The risk of the motor being started without the sound being able to be emitted for the operator is reduced as a result, which reinforces the operating safety of the robot.

According to advantageous but optional aspects of the invention, such a control method may incorporate one or more of the following features, considered in any technically allowable combination:

The method further includes, prior to step b), a step a') for generating an order to superimpose the sound excitation signal on the input signal of one of the regulators.
  The method includes a prior step z) for acquisition, by the robot controller, of a sound excitation computer file within which the sound excitation signal is saved and, during step b), the sound excitation signal is automatically extracted from the sound excitation computer file.
  During step z), the acquired sound excitation computer file is stored in a memory of the axis controller, and during step b), the sound excitation signal is superimposed with the input signal of the current regulator of the axis controller.
  During step z), the acquired sound excitation computer file is stored in a memory of the central unit, and during step b), the sound excitation signal is superimposed with the input signal of the position regulator of the axis controller.
  The method further includes a prior step y) for the automatic generation of the sound excitation computer file from a source sound file.
  Step y) for generating the sound excitation file includes an automatic digital decoding operation of the source sound file to a predefined format to form the sound excitation computer file.
  Step y) for generating the sound excitation computer file includes an automatic sampling operation of the source sound file at a sampling frequency equal to the frequency of the regulator on the input of which the sound excitation signal is intended to be superimposed.
  Step y) for generating the sound excitation computer file includes an operation for automatic correction of the amplitude of the sound excitation signal, to adapt the maximum amplitude of the absolute value of the sound excitation signal to specifications of the input point receiving the input signal.
  Step y) for generating the sound excitation computer file includes an operation for automatic correction of the amplitude of the sound excitation signal, so that the maximum amplitude of the absolute value of the sound excitation signal is less than or equal to 50% or 30% of the maximum amplitude of the input signal.
  During step c), the audible sound is emitted continuously or repeatedly over time, and in that the method also includes the following steps:
  d) receiving an acknowledgment command,
  d') interrupting the emission of the audible sound, by the control unit of the robot, once the acknowledgment command has been received.

According to another aspect, the invention relates to an industrial robot including:

a moving robot arm provided with at least one electric motor suitable for moving this robot arm, and a robot controller, including:

a central unit, suitable for executing a program for commanding the robot arm and, in response, calculating and sending position instructions;

an axis controller, suitable for generating supply voltages of said motor as a function of the calculated position instructions, using cascading regulators including at least one input point receiving an input signal.

The robot controller is configured, during the generation of the supply voltages, to superimpose a sound excitation signal with the input signal of one of the regulators to form a composite signal, the supply voltages being generated as a function of the composite signal.

BRIEF DESCRIPTION OF THE SEVERAL VIEWS OF THE DRAWINGS

The invention will be better understood and other advantages thereof will appear more clearly in light of the following description of two embodiments of a control method, provided solely as an example and done in reference to the appended drawings, in which.

DETAILED DESCRIPTION OF THE INVENTION

Figure 1:
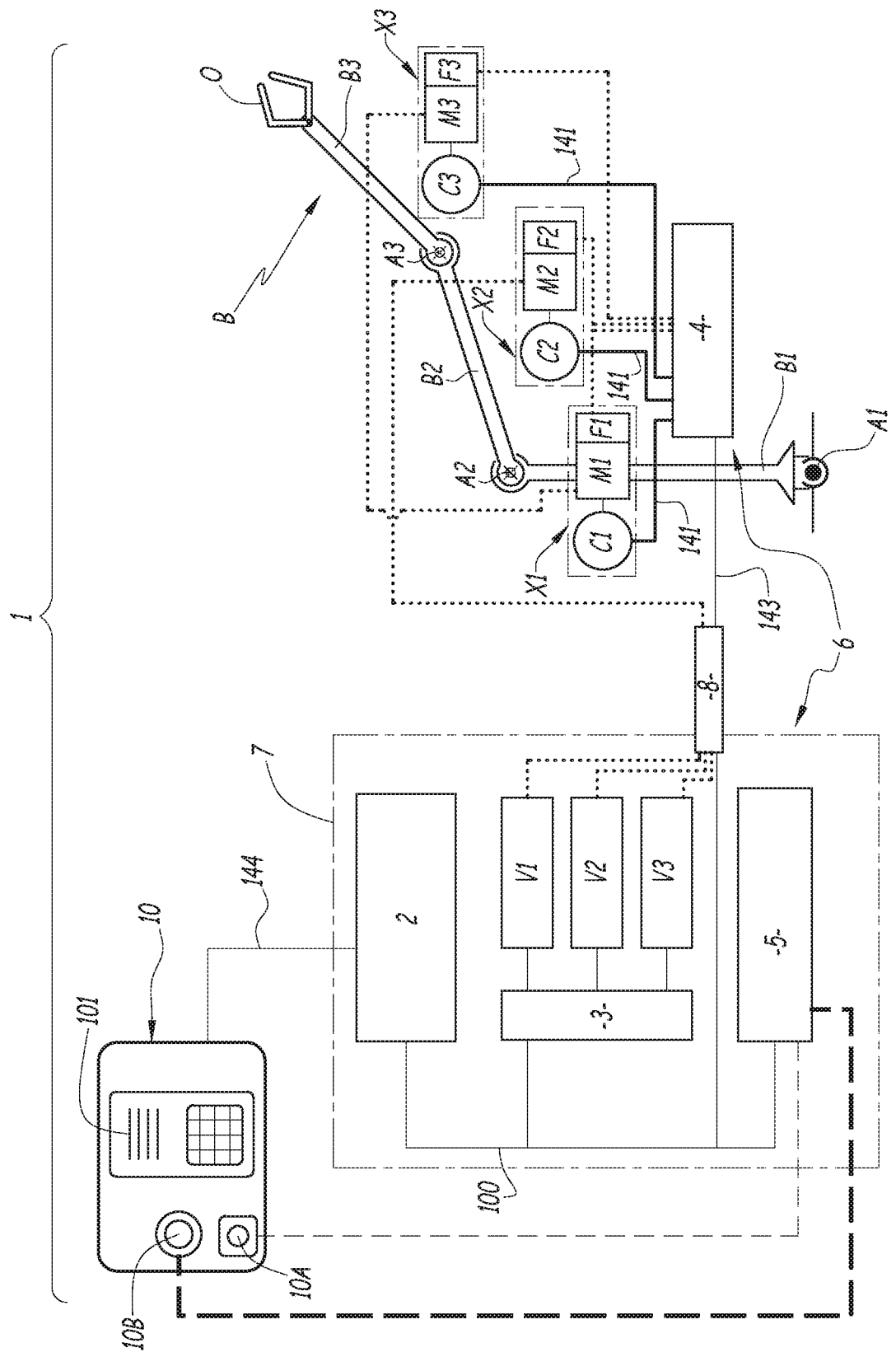
FIG. 1 schematically shows an industrial robot according to the invention.

FIG. 1 schematically shows an industrial robot including an articulated robot arm B. In this example, the robot 1 is of the type with three axes with three degrees of freedom. Alternatively, the robot 1 may be different. For example, it may be a robot with six axes or a robot of the SCARA type with four axes.

The robot arm B includes several moving parts that are articulated in pairs by pivot links. A distal end of the robot arm B is provided with a controllable tool O. A proximal end of the robot arm B is articulated to a stationary core of the robot 1.

In this example, the robot arm B includes three moving parts B1, B2 and B3, here each rectilinear. Reference "A1" denotes the geometric articulation axis between the moving part B1 and the stationary core, "A2" is the geometric articulation axis between the moving parts B1 and B2, and "A3" denotes the geometric articulation axis between the moving parts B2 and B3.

The robot 1 includes controllable actuators X1, X2 and X3 suitable for moving the moving parts B1, B2 and B3 relative to one another, so as to move the tool O in space. To that end, the actuators X1, X2 and X3 are placed at the articulations of the robot arm B.

Each of the actuators X1, X2 and X3 includes an electric motor, respectively denoted M1, M2 and M3. The motors M1, M2 and M3 are each able to move the moving parts B1, B2 and B3, respectively, around the corresponding geometric articulation axis A1, A2 and A3. In this example, the motors M1, M2 and M3 are three-phase synchronous electric motors.

In FIG. 1, for clarity reasons, the motors M1, M2 and M3 are illustrated outside the robot arm B. In practice, however, the motors M1, M2 and M3 are positioned at the articulation axes A1, A2 and A3, respectively, so as to exert a rotational torque around these articulation axes A1, A2 and A3 to move the moving parts B1, B2 and B3.

The robot arm B further includes position sensors, or coders, C1, C2 and C3 that are suitable for measuring the relative position of each of the moving parts B1, B2 and B3 in space, here to measure their angular position around geometric articulation axes A1, A2 and A3. Each coder C1, C2 and C3 thus provides movement information corresponding to a position of the moving part with which it is associated. The coders C1, C2 and C3 here are respectively associated with the motors M1, M2 and M3 within the actuators X1, X2 and X3.

Advantageously, the robot arm B includes controllable electromagnetic brakes F1, F2 and F3 that are suitable for inhibiting or, selectively, allowing a movement of the moving parts B1, B2 and B3. In this example, the electromagnetic brakes F1, F2 and F3 are respectively associated with the motors M1, M2 and M3 within the actuators X1, X2 and X3. Such electromagnetic brakes are well known by those skilled in the art and are not described here in more detail. Alternatively, the electromagnetic brakes F1, F2 and F3 can be omitted.

The robot 1 also includes a robot controller 6 suitable for controlling the operation of the actuators X1, X2 and X3 so as to selectively move the robot arm B in space according to a predefined control program. In practice, controlling the actuator X1, X2 or X3 amounts to controlling the corresponding motor M1, M2 and M3, respectively.

To that end, the robot controller 6 includes a central unit 2, an electronic movement control board 3, an electronic security board 5, an electronic interfacing board 4, as well as variable power devices V1, V2 and V3.

The central unit 2, the control board 3, the variable power devices V1, V2 and V3 and the security board 5 here are grouped together within a cabinet 7. The interfacing board 4 is placed at the foot of the robot arm B outside the cabinet 7.

Alternatively, the electronic movement control board 3, the electronic security board 5 and/or the electronic interfacing board 4 can be replaced by software modules with an equivalent functionality executed by the central unit 2.

The robot 1 also includes a manual command unit 10 provided with a communication interface 101, for example a keyboard and a display screen, that allows an operator to send command orders to the robot 1. The manual control unit 10 is connected to the central unit 2, using a data link 144.

The central unit 2, the control board 3 and the security board 5 are connected to one another by a data bus 100. The data bus 100 here is a fieldbus, for example according to the EtherCat communication protocol.

The central unit 2 serves to execute programs for commanding the robot 1. The central unit 2 is programmed to determine, using a predefined kinematic model associated with the robot arm B, the relative positions that must be assumed by the moving parts B1, B2 and B3 of the robot arm over time to satisfy a specified command program, with the aim of moving the tool O in space over time following a predefined trajectory according to the command program. Based on this determination, the central unit 2 is programmed to calculate and emit position instructions to be achieved for each of the motors M1, M2, M3. These position instructions are next delivered to the control board 3, here by the data bus 100.

To that end, the central unit 2 includes a computing unit, and a memory 20. The internal memory 20 includes instructions for carrying out the method of FIG. 6 when these instructions are executed by the electronic computer of the central unit 2. The association of the control board 3 with each of the variable power devices V1, V2 or V3, respectively, forms an axis controller of the robot arm B for the corresponding articulation axis A1, A2 or A3. Such an axis controller makes it possible to ensure regulated operation of the motor M1, M2 and M3 with which it is associated, from position instructions calculated and sent by the central unit 2.

In this example, reference 3' denotes the axis controller associated with the motor M1, corresponding to the association of the control board 3 and the variable power device V1.

The control board 3 serves to develop command instructions for each of the variable power devices V1, V2 and V3 so as to control the motors in a regulated manner, based on motor position instructions received from the central unit 2 and based on movement information provided by the coders C1, C2 and C3.

The variable power devices V1, V2 and V3 provide electricity for the phases of the motors M1, M2 and M3, respectively, here owing to a bridge electrical circuit including an upper branch, grouping together three switchable switches each connected to a positive bus and a phase of one of the corresponding motors M1, M2 and M3, and a lower branch, grouping together switchable switches each connected to a negative bus and to a phase of one of the corresponding motors M1, M2 and M3.

The variable power devices V1, V2 and V3 generate supply voltages intended for motors M1, M2 and M3, respectively, based on command instructions provided by the control board 3.

The security board 5, or security controller, is intended to ensure safe operation of the robot 1. In particular, the security board 5 is configured to execute programs monitoring the movement of the robot arm and, over time, to command stopping of the robot when a failure or an anomaly is detected. Here, as illustrated in FIG. 1, the security board 5 is connected to the data bus 100 so as to receive movement information of the robot arm B from sensors C1, C2 and C3.

In this example, the manual control unit 10 includes an emergency stop button 10A and a dead man's switch 10B. The buttons 10A and 10B are directly cabled using a wired connection to the security board 5 to allow an operator of the robot 1 to interrupt operation in case of emergency.

The interfacing board 4 provides an interface for the exchange of information between the robot controller 6 and the robot arm B. To that end, the interfacing board 4 includes a signal processing module programmed to collect measuring signals emitted by the sensors C1, C2 and C3 and to condition them such that they are usable by the other components of the robot controller 6. For example, the interfacing board 4 is suitable for conditioning analog measuring signals emitted by the sensors C1, C2 and C3, using an analog-digital converter, then sending information relative to these signals to the data bus 100, in a form compatible with the EtherCat protocol.

The interfacing board 4 here is connected to each of the coders C1, C2 and C3 using a data link 141, for example according to the "EnDat" protocol developed by HEIDENHAIN.

The interfacing board 4 is connected to the bus 100 via a data link 143. The cabinet 7 includes a cable 8 allowing the passage of data links and power connections between the cabinet 7 and the robot arm B.

Figure 2:
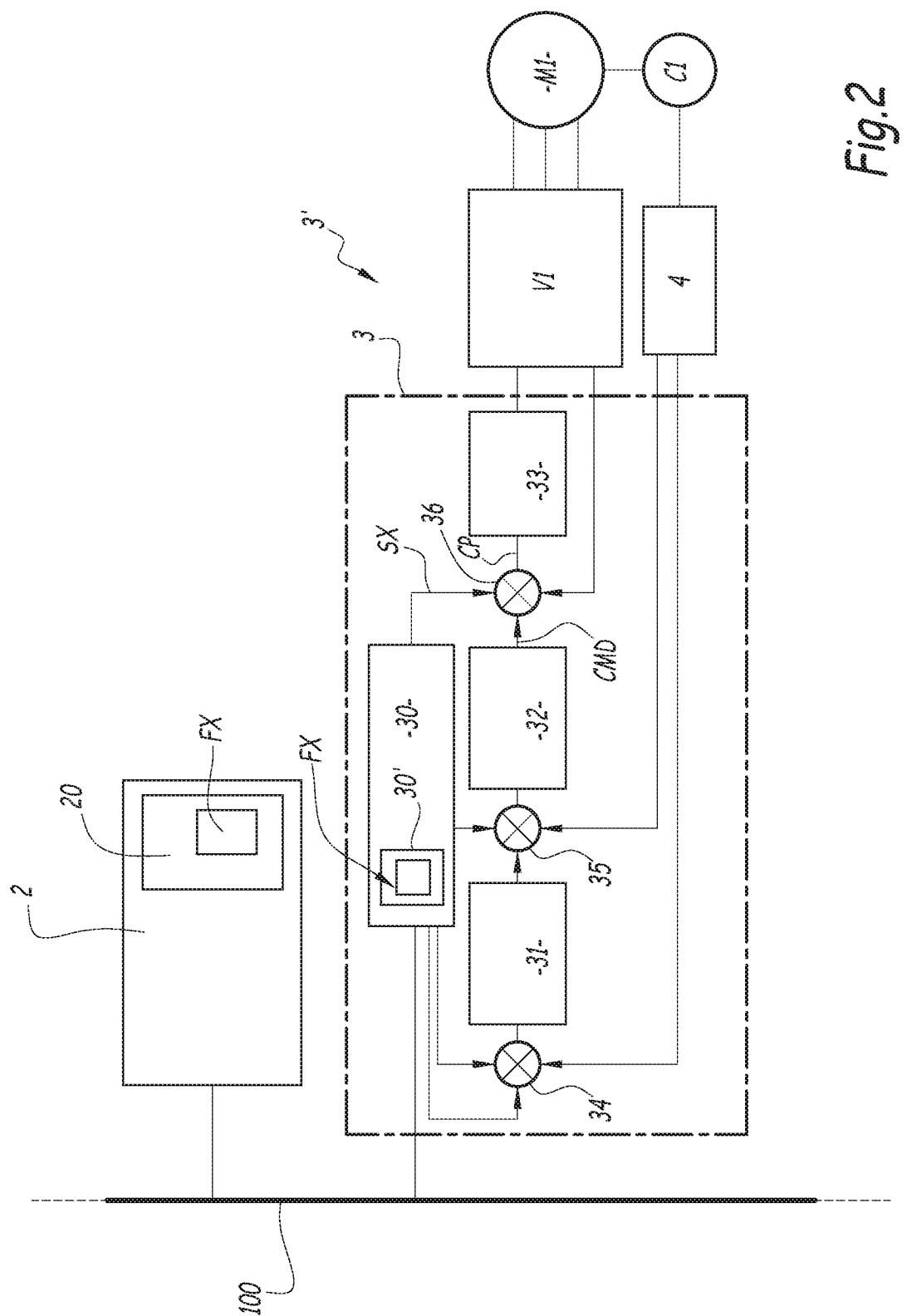
FIG. 2 shows a block diagram illustrating one portion of a robot controller of FIG. 1 to control one of the motors of the robot arm of FIG. 1.

FIG. 2 shows the control board 3 in more detail.

To simplify FIG. 2, the connections to the motors M2 and M3 are not shown. In practice, however, the board 3 is able to control the motors M1, M2 and M3 of the actuators X1, X2 and X3. Everything described in reference to the control of the motor M1 can therefore be transposed to the motors M2 and M3.

Alternatively, the robot controller 6 includes a control board 3 dedicated to each of the actuators X1, X2 and X3. In this case, each of these control boards is connected to a single variable power device V1, V2, V3 corresponding to this actuator and the data bus 100.

The control board 3 includes a computing unit 30 provided with a memory 30'. The control board 3 also includes cascading regulators to implement control loops of the motor M1 interleaved with one another.

More specifically, the control board 3 here includes a position regulator 31, a speed regulator 32 and a current regulator 33 in a cascade and that are provided with input points 34, 35 and 36, respectively. Here, the input points 34, 35 and 36 are summing units.

The central unit 2 generates a position instruction and sends it to the computing unit 30. A position regulator 31 receives, on its input point 34, this position instruction as an input signal from the computing unit 30 and, in response, generates a speed instruction. The speed regulator 32 receives, as input signal, this speed instruction on its input point 35 and, in response, generates a current instruction. Lastly, the current regulator 33 receives, as input signal, this current instruction on its input point 36 and, in response, generates a command instruction that is provided to the variable power device V1 to generate the supply voltages of the motor M1.

Each regulator 31, 32 and 33 regulates the command that it generates based on return information, for example using a feedback loop provided via a PID-type regulator.

In this example, the regulators 31 and 32 receive movement information from the coder C1 on their input points 34 and 35, respectively. The current regulator 33 receives current information from the variable power device V1 on its input point 36.

Each regulator associated with its input point and a conditioning circuit for the corresponding return information, here the coder C1 or the variable power device V1, constitutes a regulating loop. The current regulating loop is interleaved in the speed regulating loop, which in turn is interleaved in the position regulating loop.

The regulations are done repeatedly over time at a pace having a predefined frequency. In other words, each regulator 31, 32 and 33 updates, repeatedly with the predefined frequency, the value that it generates as output, as a function of the values of the signals that it receives as input.

The operation of the regulators 31, 32 and 33 is paced increasingly, i.e., the pacing frequency of the current regulator 33 is higher than that of the speed regulator 32, which in turn is higher than that of the position regulator 31.

In this example, the position control loop is paced with a fixed frequency of 1 kHz, the speed control loop is paced with a fixed frequency comprised between 2 kHz and 5 kHz, and the current control loop is paced with a fixed frequency comprised between 8 kHz and 15 kHz.

The robot 1 is further configured to emit an audible sound intended for an operator located near the robot arm B. "Audible sound" here refers to a sound whose acoustic properties are adapted so that the sound is perceived by a normal human ear in an environment of the robot 1 when it is operating. As an example, the audible sound here has frequencies comprised between 20 Hz and 20 kHz and has an acoustic pressure greater than 50 dB. Advantageously, the audible sound is different from the noise generated by the normal operation of a motor M1, M2 or M3. For example, the audible sound corresponds to a musical note emitted continuously. Alternatively, this audible sound is different. It may in particular involve a voice message, either prerecorded or generated by a voice synthesis module, for example on board the robot controller 6.

This audible sound is generated from a corresponding sound excitation signal SX. "Corresponding" here means that the sound signal is able to be converted toward the audible sound. In this example, this conversion is done by the motors M1, M2 and/or M3.

To that end, the robot controller 6 is configured to superimpose the sound excitation signal SX on the input signal CMD of one of the regulators 31, 32, 33, to form the composite signal CP, this composite signal then being provided at the input of the corresponding regulator 31, 32, 33.

In this way, the command instructions provided to the variable power device V1, and therefore the power voltages generated, then provided to the motor M1, account for the sound excitation signal SX. Thus, in response, the motor M1 emits an audible sound corresponding to the sound excitation signal SX. The audible sound is emitted due to the vibrations of the motor M1. Furthermore, the mechanical structure forming the robot 1 is also subject to resonance that amplifies the audible sound generated by the motor M1.

For example, this sound excitation signal SX is recorded in a sampled digital form in a sound excitation computer file FX.

In a first embodiment, the sound excitation computer file FX is stored in an internal memory 30' of the control board 3. The board 3 is configured to superimpose this sound excitation signal SX on the input signal CMD on the input point 36 of the current regulator 33.

Thus, the sound to be emitted can be modified easily by accessing the memory 30'. Furthermore, the pacing frequency of the current regulator 33 being high, a good sound retrieval is guaranteed for frequencies corresponding to the audible spectrum of an adult human operator.

Figure 3:
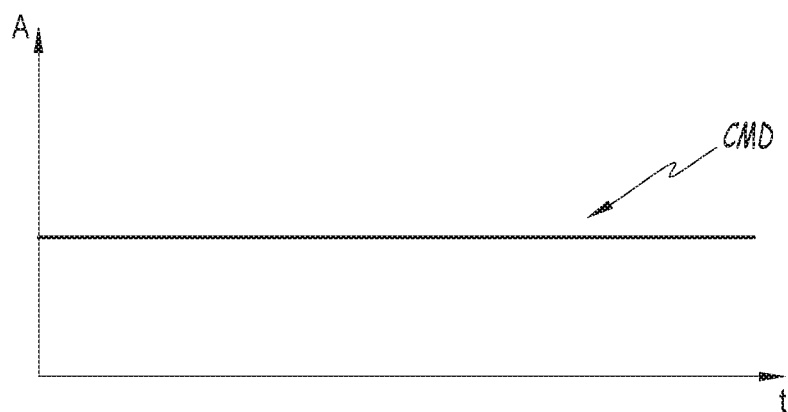
FIG. 3 schematically shows the evolution, as a function of time, of the amplitude of an input signal of a regulator of an axis controller belonging to the robot controller of FIG. 2.
Figure 4:
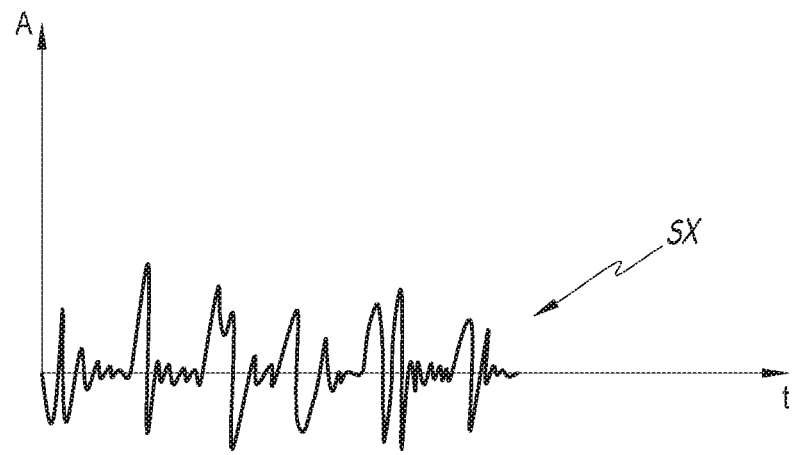
FIG. 4 schematically shows the evolution, as a function of time, of the amplitude of a sound excitation signal.
Figure 5:
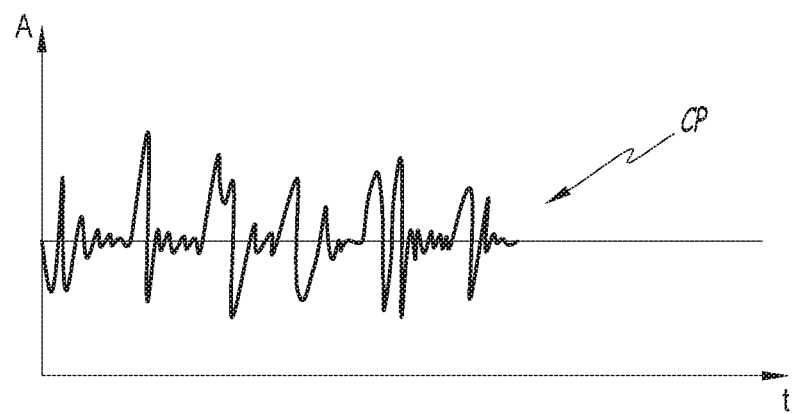
FIG. 5 schematically shows the evolution, as a function of time, of the amplitude of a composite signal formed by superimposing the sound excitation signal of FIG. 4 on the input signal of FIG. 3.

FIGS. 3, 4 and 5 show one example of such a superposition in more detail. FIG. 3 shows the evolution, as a function of time t, of the amplitude of the input signal CMD received at the input of the input point 36 of the current regulator 33. In this example, this input signal CMD is kept equal to a constant value, such that the axis controller 3' commands the motor M1 to maintain a constant torque, so as to keep the moving part B1 in a predefined position.

FIG. 4 schematically shows the evolution, as a function of time t, of the amplitude of the sound excitation signal SX. FIG. 5 shows the evolution, as a function of time t, of the composite signal CP formed by the superposition of the sound excitation signal SX with the input signal CMD. The amplitudes A are indicated here in arbitrary units. The emission of the audible sound is not necessarily because the robot arm B is moving. It may occur while the robot arm B is immobile and the motor M1 is powered on.

Figure 6:
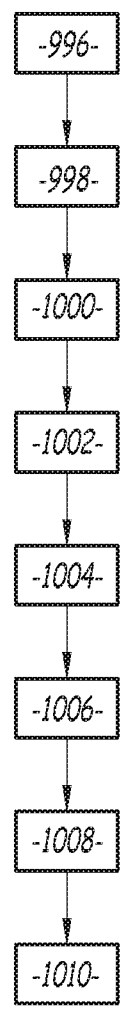
FIG. 6 is a flowchart of a control method according to the invention for controlling the robot of FIG. 1.

An operating example of the control method according to this first embodiment is now described in reference to the flowchart of FIG. 6 and using FIGS. 1 to 5.

Initially, the robot 1 is provided with its robot arm B in a given configuration. The sound excitation computer file FX is previously stored in the memory 30', in the form of a sampled digital file.

For example, during a prior step 998, the sound excitation computer file FX is acquired, for example from an outside medium such as a USB key connected to the manual control unit 10, or from a remote computer server through a network connection. This sound excitation computer file FX is next saved in the memory 30'.

During a step 1000, a control program of the robot arm B is executed by the central unit 2, for example in response to an action by an operator of the robot 1 on the man-machine interface 101.

For example, the robot arm B is intended to follow a particular trajectory over time, by moving the moving parts B1, B2 and B3 of the robot arm B relative to one another. In so doing, it is for example necessary to emit, at specific points of this path, an audible sound intended for an operator located near the robot arm B, for example when the robot arm B reaches a predetermined position, or to warn that the robot arm B will be set in motion very soon, or while waiting for the performance of an action outside the robot 1, such as an interaction with an operator of the robot 1.

The central unit 2 then calculates position instructions of the robot arm B and sends them to the axis controller 3'.

In parallel, during a step 1002, the control unit 6 further generates at least one order to superimpose the sound excitation signal SX to emit the sound and sends this order to the axis controller 3'. This generation here is done automatically, as a function of the command program executed. It results from the interpretation of a specific instruction of the program of the robot arm B or a command entered on the manual control unit 10. The emission of the sound is thus commanded intentionally, and is in particular associated with meeting certain conditions of the control program. Alternatively, the order to superimpose the sound excitation signal SX may come from the execution of a background program by the central unit 2 in parallel with the execution of the control program of the robot arm B, for example a program to monitor the temperature of the motors, the purpose of which would be to warn the user that a determined temperature threshold has been exceeded.

Next, during a step 1004, the axis controller 3' receives the position instructions calculated by the central unit and generates the supply voltages of the motor M1 accordingly. During this step 1004, the axis controller also receives the order to superimpose the sound excitation signal SX on the input signal CMD.

Then, the computing unit 30 automatically extracts the sound excitation signal SX from the sound excitation computer file FX contained in the memory 30' and injects this sound excitation signal SX at the input point 36 of the current regulator 33 to superimpose it on the input signal CMD of this current regulator 33. This superposition is done by sending, upon each cycle of the pacing of the current control loop, a sampled value of the excitation signal SX to the input point 36.

The current regulator 33 then receives the composite signal CP as input. It next generates the command instructions for the variable power device V1, as a function of the composite signal CP. The variable power device V1 generates the supply voltages of the motor M1 in response.

Next, during a step 1006, the axis controller 3' sends the corresponding supply voltages to the motor M1, to control this motor M1 and set it in motion, and at the same time, to generate the sound corresponding to the sound excitation signal SX.

Thus, the emission of the audible sound for the operator is inseparable from the ability of the actuators of the robot arm to work. This reduces the risk of the motor beginning to work without the audible sound having been able to be emitted. The operating safety of the robot 1 is thus improved.

This security is reinforced here by the fact that the control of the motors M1, M2 and M3 of the robot arm B is done redundantly. Indeed, the components of the robot 1 are advantageously compliant with security standard EN 13849-A. Furthermore, any failure in the control of the motors M1, M2 and M3 is automatically detected by the security board 5, the central unit 2 or the axis controller 3'.

In this example, to simplify, only the power supply of the motor M1 is described in detail. In practice, it is also possible to emit a sound using the motors M2 and/or M3. Thus, everything described in reference to the motor M1 and the axis controller 3' applies to the motors M2 and M3 and their corresponding axis controllers.

Preferably, the same sound excitation signal SX is used for each of the motors M1, M2 and M3. However, it is possible to use a sound excitation signal specific to each of the motors M1, M2 and M3. For example, the control board 3 automatically selects an appropriate sound excitation signal SX.

As an example, in the case of an industrial robot with six axes, the actuator that controls the articulation between the robot arm and the stationary core is preferably used, since it is able to deliver substantial power and is fastened to large structural elements, which allows better audio retrieval of the audible sound.

Advantageously, during step 1006, the audible sound is emitted continuously or repeatedly over time by the motor M1, for example to signal that the robot 1 is waiting for a specific action from the operator, such as providing a part in the tool O, or that the operator must leave an area around the robot arm B. Thus, the control method further includes, after step 1006:
- a step 1008 for receiving an acknowledgment command from the operator, for example using the manual control unit 10, for example making it possible for the operator to indicate to the robot 1 that he has indeed heard the audible sound; and
- a step 1010 for interrupting the emission of the audible sound, by the central unit 2, which generates an interruption order and sends it to the control board 3, once the acknowledgment command is received. The control board 3 then stops superimposing the sound excitation signal SX on the input signal CMD.

Advantageously, the control method includes, before step 998, a prior step 996 for the automatic generation of the sound excitation computer file FX from a source sound file. For example, the source sound file is encoded in a digital format, such as the MP3 or WAV format. The implementation of the method is thus made easier, inasmuch as sound files with such a format are readily available and/or publishable from common tools.

For example, when a user provides a source sound file to the central unit 2, the latter automatically carries out step 996 in order to obtain a corresponding sound excitation computer file FX. A user of the robot 1 can thus customize the audible sounds played by the robot 1.

This step 996 advantageously includes a digital decoding operation of the source sound file to decode the content thereof, so as to create the sound excitation computer file FX containing the sound excitation signal SX. For example, a codec corresponding to the encoding format of the source sound file is applied on the digital source file. This decoding operation is for example done by the digital computer of the central unit 2.

Advantageously, step 996 further includes an automatic sampling operation of the source sound file with a sampling frequency equal to the frequency of the regulator 31, 32, 33 on the input of which the sound excitation signal SX is intended to be superimposed. More specifically, the raw signal extracted from the source sound file is sampled, to form the source excitation signal SX. By adapting the sampling frequency with the frequency of the corresponding regulator 31, 32 or 33, the quality of the sound retrieval is improved. One in particular avoids distortion of the sound, which would occur in case of significant difference between these frequencies.

As an illustration, in this example, the pacing frequency of the current control loop is equal to 10 kHz. The sampling frequency is then chosen to be equal to 10 kHz. This sampling operation is for example done by the computing unit of the central unit 2.

Advantageously, step 996 also includes an operation for conditioning the signal extracted from the source sound file in order to form the source excitation signal SX.

This conditioning operation advantageously contains a correction of the amplitude of the signal extracted from the digital source file, in order for the maximum amplitude of the absolute value of the sound excitation signal SX thus obtained to be less than or equal to 50% of the maximum amplitude of the input signal CMD, and preferably, less than or equal to 30% of the maximum amplitude of the input signal CMD.

This conditioning operation further includes an operation for filtering the extracted signal, in order to eliminate the low frequencies therefrom that could disrupt the operation of the motor M1. For example, all of the frequencies below or equal to 100 Hz, or preferably, less than or equal to 50 Hz, are eliminated.

Still more advantageously, the conditioning operation further includes applying a first-order high pass filter, so as to improve the quality of the audible sound emitted by the motor M1, more particularly such that it has a sound quality similar to that generated by a transducer of the speaker type. For example, the components of the sound excitation signal SX having a frequency greater than or equal to 10 kHz, or greater than or equal to 5 kHz, are eliminated. Advantageously, several sound excitation computer files FX are stored in the memory 30', each containing a sound excitation signal SX. Then, during step 1004, the control board 3 automatically chooses the sound excitation computer file FX corresponding to the order sent by the central unit 2 from among a plurality of sound signals.

Alternatively, during step 1002, the order to superimpose the excitation signal SX is generated in response to an action by a user, for example on the manual control unit 10. Thus, the emission of the sound can be triggered manually, independently of a control program of the robot arm B executed automatically by the central unit 2. This in particular makes it possible to trigger a sound during the test or learning phases of the robot 1.

In a second embodiment, the sound excitation computer file FX acquired during step 998 is stored in the memory 20 of the central unit 2. The central unit 2 is further programmed so as, during step 1004, to extract the sound excitation signal SX automatically from the sound excitation computer file FX, and to send it, using the bus 100, to the computing unit 30 of the control board 3 so that the latter superimposes it on the input signal CMD of one of the regulators 31, 32 or 33.

This superposition is preferably done on the position regulator 31 input point 34, since it has a lower pacing frequency compatible with the transmission frequency from the central unit 2 to the control board 3 in its synchronous mode by the bus 100.

For example, the sampled values of the sound excitation signal are successively sent one after the other to the computing unit 30 with a frequency equal to the frequency of the position regulator 31.

In this case, the sound excitation computer file FX has previously been sampled at the frequency of the position regulator 31, here equal to 1 kHz.

These arrangements make it possible to simplify the production of the control board 3, inasmuch as the management of the sound excitation computer file FX is provided by the central unit 2 and not by the computing unit 30.

Aside from these differences, everything described in reference to the first embodiment applies to the second embodiment.

According to other alternatives, the number of regulators 31, 32, 33 can be different. In particular, the speed regulator may not be implemented.

Alternatively, the superposition of the sound excitation signal SX can be done with the input signal of a regulator other than the position or current regulator.

The invention has been described in embodiments that have an input point of the cascading regulators corresponding to the input points of the position 31 or current 33 regulators. Alternatively, the input point can be implemented at other levels of the conditioning of the control instruction of the variable power devices V1, V2, V3. In other words, the superposition of the sound excitation signal SX can be done with an input signal CMD corresponding to a step of the regulation comprised between the position instruction and the control signal of the power amplification stage, here the variable power devices V1, V2, V3.

The embodiments and alternatives considered above may be combined with one another to create new embodiments.

The invention claimed is:

1. A method for controlling an industrial robot comprising a moving robot arm provided with at least one electric motor suitable for moving this robot arm and provided with a robot controller including a central unit and an axis controller, comprising:
   z) acquiring, by the robot controller, a sound excitation computer file within which a sound excitation signal is saved;
   a) executing, by the central unit, a control program of the robot arm and, in response, calculating and sending position instructions of the robot arm;
   b) generating supply voltages of said at least one electric motor by the axis controller as a function of the calculated position instructions, using cascading regulators including at least one input point receiving an input signal, said regulators including a current regulator, a speed regulator and a position regulator, each of said regulators using a feedback loop, the current regulating feedback loop being interleaved in the speed regulating feedback loop, the speed regulating feedback loop being in turn interleaved in the position regulating feedback loop, the operating frequency of the current regulator being higher than the operating frequency of the speed regulator, the operating frequency of the speed regulator being higher than the operating frequency of the position regulator; and
   c) controlling said at least one electric motor with the generated supply voltages,
   wherein, during step b), the sound excitation signal is automatically extracted from the sound excitation computer file and superimposed, by the robot controller, with the input signal of one of the regulators to form a composite signal, this composite signal then being provided at the input of the corresponding regulator, the supply voltages being generated as a function of the composite signal.

2. The control method according to claim 1, wherein the method further includes, prior to step b), a step a') for generating an order to superimpose the sound excitation signal on the input signal of one of the regulators.

3. The control method according to claim 1, wherein, during step z), the acquired sound excitation computer file is stored in a memory of the axis controller, and in that during step b), the sound excitation signal is superimposed with the input signal of the current regulator of the axis controller.

4. The control method according to claim 1, wherein, during step z), the acquired sound excitation computer file is stored in a memory of the central unit, and in that during step b), the sound excitation signal is superimposed with the input signal of the position regulator of the axis controller.

5. The control method according to claim 1, wherein the method further includes a prior step y) for the automatic generation of the sound excitation computer file from a source sound file.

6. The control method according to claim 5, wherein step y) for generating the sound excitation computer file includes an automatic digital decoding operation of the source sound file to a predefined format to form the sound excitation computer file.

7. The control method according to claim 5, wherein the step y) for generating the sound excitation computer file includes an automatic sampling operation of the source sound file at a sampling frequency equal to the frequency of the regulator on the input of which the sound excitation signal is intended to be superimposed.

8. The control method according to claim 5, wherein step y) for generating the sound excitation computer file includes an operation for automatic correction of the amplitude of the sound excitation signal, to adapt the maximum amplitude of the absolute value of the sound excitation signal to specifications of the input point receiving the input signal.

9. The control method according to claim 8, wherein step y) for generating the sound excitation computer file includes an operation for automatic correction of the amplitude of the sound excitation signal, so that the maximum amplitude of the absolute value of the sound excitation signal is less than or equal to 50% or 30% of the maximum amplitude of the input signal.

10. The control method according to claim 1, wherein, during step c), an audible sound is emitted continuously or repeatedly over time, and in that the method also includes the following steps:
   d) receiving an acknowledgment command,
   d') interrupting the emission of the audible sound, by the central unit of the robot, once the acknowledgment command has been received.

11. An industrial robot, comprising:
a moving robot arm provided with at least one electric motor suitable for moving this robot arm, and
a robot controller, including:
   a central unit, suitable for executing a program for commanding the robot arm and, in response, calculating and sending position instructions; and
   an axis controller, suitable for generating supply voltages of said at least one electric motor as a function of the calculated position instructions, using cascading regulators including at least one input point receiving an input signal, said regulators including a current regulator, a speed regulator and a position regulator, each of said regulators using a feedback loop, the current regulating feedback loop being interleaved in the speed regulating feedback loop, the speed regulating feedback loop being in turn interleaved in the position regulating feedback loop, the operating frequency of the current regulator being higher than the operating frequency of the speed regulator, the operating frequency of the speed regulator being higher than the operating frequency of the position regulator;
wherein the robot controller is configured to acquire a sound excitation computer file within which a sound excitation signal is saved; and
wherein the robot controller is further configured, during the generation of the supply voltages, to automatically extract the excitation computer file from the sound and superimpose said sound excitation signal with the input signal of one of the regulators to form a composite signal, this composite signal then being provided at the input of the corresponding regulator, the supply voltages being generated as a function of the composite signal.

* * * * *